United States Patent [19]
Wang et al.

[11] Patent Number: 5,502,785
[45] Date of Patent: Mar. 26, 1996

[54] INTEGRATED OPTICAL TRANSCEIVER CHIP

[75] Inventors: David C. Wang, Rancho Palos Verdes, Calif.; C. Y. Chen, Kaohsiung Shien, Taiwan

[73] Assignee: Hughes Aircraft Company, Los Angeles, Calif.

[21] Appl. No.: 209,505

[22] Filed: Feb. 28, 1994

[51] Int. Cl.$^6$ ............................................. G02B 6/36
[52] U.S. Cl. .................. 385/92; 385/31; 385/37; 385/88
[58] Field of Search ................ 385/88–94, 37, 385/31, 59, 8

[56] References Cited

U.S. PATENT DOCUMENTS

| | | | |
|---|---|---|---|
| 4,444,460 | 4/1984 | Stowe | 385/30 |
| 4,725,114 | 2/1988 | Murphy | 385/59 |
| 5,187,760 | 2/1993 | Huber | 385/37 |
| 5,345,524 | 9/1994 | Lebby et al. | 385/92 |
| 5,345,527 | 9/1994 | Lebby et al. | 385/8 |

OTHER PUBLICATIONS

AMP Incorporated data sheet on "FSD Transceiver" (2 pages: 40 and 42). Jan. 29, 1993.
Sumitomo Electric Industries, Ltd.; *SEI News;* "SM Fiber Optic Compatible FDDI Optical Data Link Developed"; No. 92–14; Sep. 1992 (1 page).
Wong, W. S. et al.; "Flip Chip Manufacturing Technology for GaAs MMIC"; 1993 U.S. Conf. on GaAs Manufacturing Technology; pp. 224–227. No Month.
Wang, D. C. et al.; "Low Cost GaAs Flip Chip MMICs For Microwave T/R Module Assembly"; 1993 GOMAC Conference; 1993; pp. 131–132. No Month.

*Primary Examiner*—John D. Lee
*Assistant Examiner*—Phan T. H. Palmer
*Attorney, Agent, or Firm*—M. E. Lachman; M. W. Sales; W. K. Denson-Low

[57] ABSTRACT

A transceiver is described which utilizes D-shaped optical fiber technology and advanced flip chip mounting techniques for manufacturing an integrated transceiver chip for use in electronic microcircuit applications. A single D-shaped optical fiber is used for bi-directional signal transmission, with coupling gratings superimposed on the flat surface of the fiber for coupling light into and out of the optical fiber. A light source and optical detector, aligned with the respective coupling grating for optical communication with the fiber, are flip mounted on the substrate which supports the fiber. Finally, the light source and optical detector are electrically connected with associated electronic circuitry also mounted or fabricated on the substrate.

17 Claims, 2 Drawing Sheets

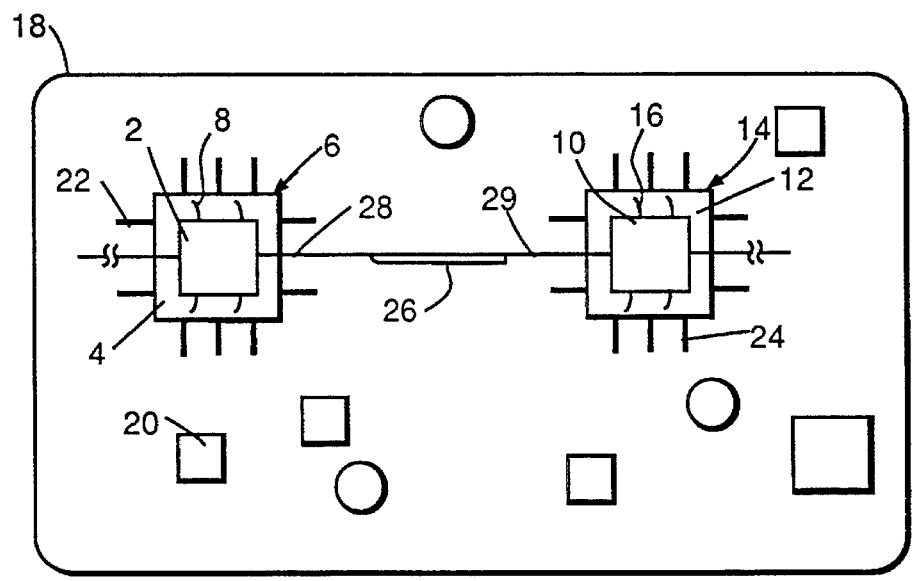
FIG. 1.
FIG. 2.
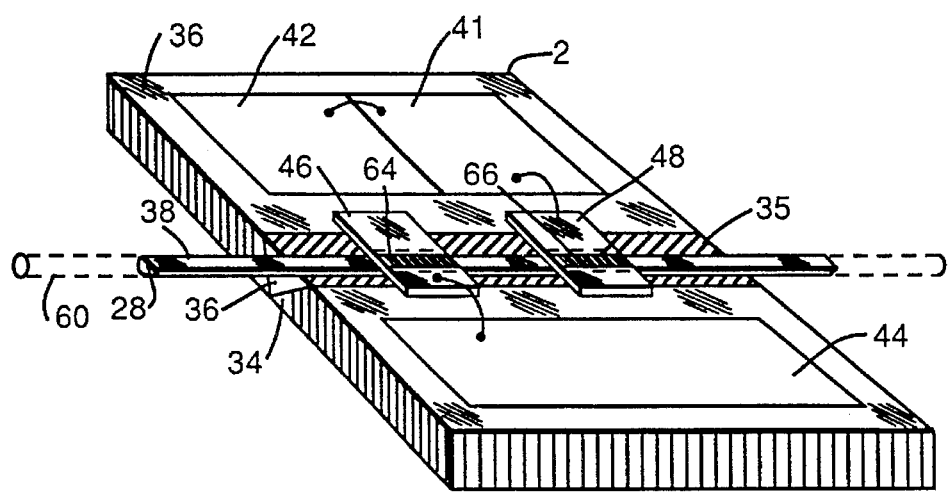

INTEGRATED OPTICAL TRANSCEIVER CHIP

BACKGROUND OF THE INVENTION

1. Field of the Invention

The present invention relates generally to fiber optic interconnect devices and methods, and more particularly to single fiber transceivers for integration into electronic microcircuits.

2. Description of the Related Art

With advances in data communications, increased emphasis is being placed on using optical fibers to replace conventional electrical wires as a signal transmission medium. Unlike electrical wires, the use of optical fibers necessarily requires an interface device for coupling between the electronic device and the optical fiber. Because most state-of-the-art electronic devices require bi-directional transmission of data for proper operation, interface devices must be capable of both transmitting signals into an optical fiber and receiving signals from an optical fiber. Devices which are specifically designed for exchanging data in this manner are commonly known as optical transceivers. Accordingly, the use of optical fibers as a replacement for electrical wires is largely dependent on the advancements made in the design of transceiver devices and methods.

Two examples of commercially available transceivers are the FSD Transceiver manufactured by Amp Incorporated which is disclosed in the Amp Inc. Product Data Sheets, and the FDDI Optical Data Link manufactured by Sumitomo Electric Industries and disclosed in SEI News, Issue No. 92-14, dated September 1992. Although currently known transceivers, such as those mentioned above, are useful for their intended purposes, they severely limit the use of fiber optics in many applications.

One major drawback of currently known transceivers is their large packaging dimensions. This makes them ineffective for many small scale electronic applications, such as interconnecting electronic microcircuits. The inability to integrate transceiver packages and make them more compact is due to a number of design factors.

One such design factor is the thermal limitations of the transceiver package. Light sources such as diode lasers and LEDs (light emitting diodes) are heat generating devices. Therefore, the integration of these devices into microcircuit packages creates thermal management problems.

Another design limitation of currently known transceiver technology is the use of conventional pigtail coupling between the electronic device and the optical fiber. Along with the added space that this type of coupling requires, it often leads to significant signal power losses when transmitting light into an optical fiber. This is due mainly to the precise alignment necessary in interfacing the electronic device with the fiber. Furthermore, the risk of improper alignment leading to a complete loss of signal communication makes this method of coupling unreliable and impractical in many fiber optic applications. The use of conventional pigtailing also prevents optical fibers from being used for wavelength multiplexing operations, such as simultaneous communication between a number of transceivers interconnected on a single optical fiber.

Finally, currently known transceivers require two separate optical fibers for data communication; one for transmitting and one for receiving. U.S. Pat. No. 4,444,460, entitled "Optical Fiber Apparatus Including Substrate Ruggedized Optical Fibers," issuing to Stowe, discloses the use of a single optical fiber for allowing certain wavelengths of light to be diffracted into or out of an optical fiber. This patent, however, does not teach or suggest a device or method of integrating electronic devices with an optical fiber for optically communicating between the electronic device and the optical fiber. As such, Stowe does not explore the relationship of using a single optical fiber in optical transceiver devices.

SUMMARY OF THE INVENTION

In view of the above limitations of currently known optical transceiver technology, the present invention seeks to integrate an optical fiber with semiconductor devices to provide a transceiver package for use in small scale electronic applications, such as interconnections between electronic microcircuit devices.

Many advantages, including improved performance and reduced cost, result from the fabrication of the integrated transceiver chip. For example, integration raises the overall operational speed of the transceiver device due to reduced parasitic capacitance. Simplified assembly and increased product throughput result in increased efficiency and reliability, with a lower cost for each transceiver manufactured. Furthermore, mechanical reliability is significantly increased by using advanced mounting techniques which rapidly transfer heat away from heat generating sources within the integrated transceiver chip.

The present invention also seeks to provide a transceiver which is capable of transmitting and receiving on a single optical fiber. In addition to transmission between two transceivers, the present invention permits more than two transceivers to communicate through the same optical fiber, for advanced wavelength multiplexing capabilities.

In accordance with the invention, an integrated transceiver chip incorporates D-shaped optical fiber technology and advanced flip chip mounting techniques. A base support or substrate has a groove for mounting or embedding the curved portion of the optical fiber. Prior to embedding the fiber in the groove, a metalized layer is deposited over the substrate to: 1) provide an electrical reference or ground for components mounted on the substrate, and 2) assist in soldering the fiber to the substrate.

The D-shaped optical fiber has both an input coupling grating and an output coupling grating superimposed or etched on the flat side of the fiber for coupling light into and out of the fiber.

A light source is flip chip mounted on the substrate in alignment with the input grating for coupling light into the fiber. In a similar configuration, an optical detector is flip chip mounted on the substrate in alignment with the output grating for detecting light coupled out of the fiber. The flip chip mounting technique provides mechanical (thermal) and/or electrical communication with the substrate.

In addition to supporting the optical fiber, the substrate contains associated electronic circuitry which is electrically connected to the light source and the optical detector. Specifically, the substrate contains a laser driver circuit which is mounted on or formed in the substrate and electrically connected to the light source. A transimpedance amplifier circuit and a post amplifier circuit are also mounted on or formed in the substrate, and electrically connected to the optical detector.

BRIEF DESCRIPTION OF THE DRAWINGS

These and other features and objects of the invention will be apparent to those skilled in the art from the following detailed description, taken together with the accompanying drawings, in which:

FIG. 1 is a plan view showing the transceiver of the present invention in a typical environment as an optical interconnect between electronic microcircuits;

FIG. 2 is a perspective view of the transceiver showing the layout of various components on the substrate;

DETAILED DESCRIPTION OF THE INVENTION

Figure 3:
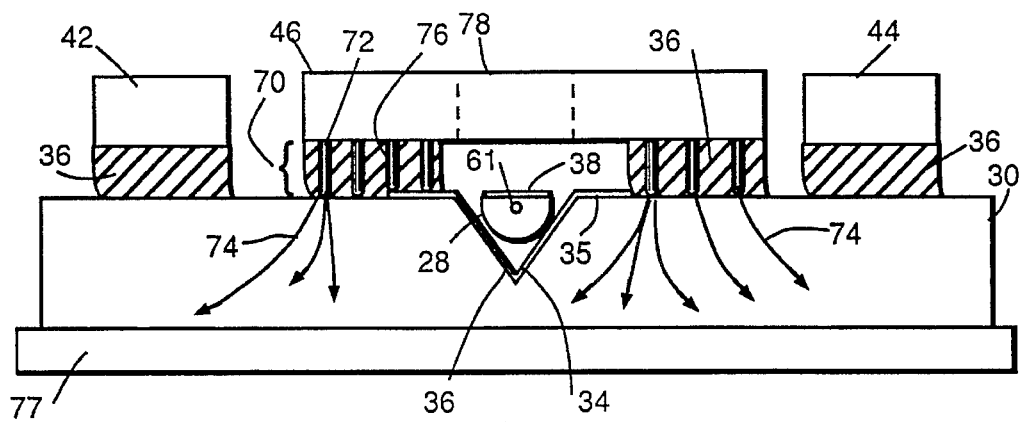
FIG. 3 is a elevational view of the transceiver, particularly illustrating the various mounting techniques that may be used for attaching components to the substrate.

A typical environment in which the present invention is intended to be used is shown in FIG. 1, in which the transceiver of the present invention is used as an optical interconnect between two electronic microcircuits.

In this particular application, a transceiver 2 is electrically connected to a substrate 4 of a microcircuit 6 by wirebonding 8 or other known techniques. Similarly, another transceiver 10 is electrically connected to the substrate 12 of another microcircuit 14 by wirebonding 16. Preferably, each microcircuit 6, 14 has dimensions of approximately 3 mm×15 mm×15 mm. For purposes of illustration only, microcircuits 6, 14 are mounted on a common circuit board 18.

Other electrical components 20 may also be mounted on circuit board 18. Some of the components 20 may be electrically connected to microcircuits 6, 14 through electrical conductors (not shown) extending from components 20 to pins 22, 24 of the respective microcircuits 6, 14.

In the environment described above and shown in FIG. 1, transceiver 2 can optically exchange data with transceiver 10 through optical fiber 26. Specifically, optical fiber 26 is connected to transceiver 2 by splicing the end of a D-shaped optical fiber 28, which extends from transceiver 2, to the optical fiber 26. In the same way, optical fiber 26 is connected to transceiver 10 by splicing optical fiber 26 to the end of a D-shaped optical fiber 29. Therefore, the use of transceivers 2, 10, in conjunction with optical fiber 26, allows an interconnection between integrated circuits on a single common circuit board 18, or between integrated circuits on remote circuit boards (not shown). The present invention can be effectively used in both inter-circuit board communications, such as Local Area Networks, and in intra-circuit board connections, replacing conventional printed circuit board tracings and wiring. Consequently, transceiver 2 has a broad range of optical communication applications. The details of the preferred embodiment of the invention will now be discussed.

An enlarged perspective view of transceiver 2 is given in FIG. 2. Substrate 30 serves as a base support for the components that comprise the transceiver 2 package. Substrate 30 is preferably formed from silicon, and is approximately 14 mm×14 mm.

Substrate 30 performs three significant functions. First, it provides a stable support for the D-shaped optical fiber 28. Second, associated electronic circuitry can be fabricated on its surface. Finally, it serves as a heat sinking device for heat generating components included within the transceiver 2 package.

To provide support for the D-shaped optical fiber 28, a groove 34 is etched across substrate 30 using commonly known etching techniques. The groove is most conveniently etched with a V-shaped profile, but other groove shapes could also be employed. The fiber 28 is positioned in the groove 34 such that the fiber's longitudinal flat side 38 is substantially coplanar with substrate 30. After positioning, the fiber 28 is permanently mounted in the groove 34 by an epoxy 36 or by a soldering process.

Prior to positioning the fiber 28 in groove 34, a portion of the substrate 30, including the etched groove 34, is preferably coated with a metalized layer 35. The metal deposited on substrate 30 can be composed of any type of metal that is both optically reflective and electrically conductive such as aluminum, silica, polymide, or epoxy acrylate.

The metalized layer 35 serves a variety of purposes. First, it eases the soldering process should the D-shaped optical fiber 28 be soldered to substrate 30. Second, it provides an electrical reference or ground for electrical components mounted on or formed in substrate 30. Finally, it is used as an optical reflector to enhance grating coupling efficiencies, discussed in greater detail below. It is to be noted, however, that grating coupling efficiencies can also be improved by metalizing the curved surface portion of the D-shaped optical fiber 28, rather than the groove 34 in which the fiber 28 is embedded.

Integration between the D-shaped optical fiber 28 and substrate 30 can be accomplished using other techniques, such as the fused fiber technique described in U.S. Pat. No. 4,444,460 mentioned previously.

As mentioned above, substrate 30 is also used for the placement or fabrication of associated electronic circuitry that is electrically connected to the other components on transceiver 2. Such circuitry can include a transimpedance amplifier circuit 41, a post amplifier circuit 42, and a laser driver circuit 44. Each of these conventional electronic circuits 41, 42, 44, are well-known in the art and can be purchased as discrete components or as a single integrated circuit package, or fabricated directly into substrate 30. FIG. 2 shows electronic circuits 41, 42, 44 packaged independently as discrete IC chips.

Finally, substrate 30 serves as a heat sink for components that generate heat, such as a light source 46 and optical detector 48, which are mounted on the substrate 30 of transceiver 2. In the preferred embodiment, light source 46 is a laser diode or an LED (light emitting diode), whereas optical detector 48 is a pin photodiode.

Typically, light source 46 and optical detector 48 are composed of III–V compounds, such as GaAs (gallium arsenide). The heat normally generated by such devices can be excessive in microcircuit packaging applications. To avoid thermal management problems which can otherwise occur, both light source 46 and optical detector 48 are mounted to a heat sink, or in the present invention, substrate 30.

Thermal management is accomplished by flip mounting the light source 46 and optical detector 48 on the flat side 38 of D-shaped optical fiber 28 and on the surface of substrate 30. The technique of flip mounting integrated circuits to electronic devices, commonly referred to as "flip chip mounting," is well-known in the art and is discussed in more detail in the following publications; W. S. Wong et al., "Flip Chip Manufacturing Technology for GaAs MMIC," 1993 U.S. Conference on GaAs Manufacturing Technology, 1993, pp. 224–227, and D. C. Wang et. al., "Low Cost GaAs Flip Chip MMICs For Microwave T/R Module Assembly," 1993 Government Microcircuit Applications Conference, 1993, pp. 131–132.

The structure of fiber 28 is important for the proper functioning of the invention. For example, the outer surface of fiber 28, shown in FIG. 2, is shaped to provide a flat surface 38 which is in close proximity to the light guiding core 61. It is to understood that the term "D-shaped optical fiber," as described throughout, is purely a technical term for a conventional circular fiber which has a flat surface, and does not imply that the optical fiber must literally be D-shaped in configuration. D-shaped optical fiber 28 can be formed from a circular optical fiber 60 by removing a portion of the fiber along its length. This can be accomplished using conventional techniques such as etching or polishing.

There are several possible methods of coupling light into and out of a D-shaped optical fiber, including bending the fiber, prism coupling, and directly fabricating gratings on the D-shaped fiber. In the preferred embodiment, gratings are fabricated on the flat surface 38 of fiber 28 for facilitating optical communication to and from the fiber core 61.

An input coupling grating 64 and an output coupling grating 66 are superimposed on the flat surface 38 of fiber 28. Preferably, both the input coupling grating 64 and the output coupling grating 66 are etched directly into the longitudinal flat surface side 38 of the fiber 32 using photolithography, holography, or other techniques known in the art.

Light source 46 is aligned directly over input coupling grating 64 for coupling light into the fiber. Similarly, optical detector 48 is aligned directly over output coupling grating 66 for detecting light coupled out of the fiber. After properly positioning and aligning both the light source 46 and the optical detector 48, these devices can be permanently fixed in place on substrate 30 using an epoxy 36.

Once both the light source 46 and detector 48 are fixed in place on substrate 30, they are connected to the electrical circuitry on the substrate 30. The light source 46 is electrically connected to driver circuit 44, while the optical detector 48 is electrically connected to the transimpedance amplifier circuit 41 and post amplifier circuit 42. The electrical connections can be accomplished by any convenient means, such as wire bonding or flip chip mounting the circuitry to metalized traces on the substrate surface that connect to the light source and detector.

The integration of light source 46 and optical detector 48 with substrate 30 using a flip chip mounting configuration is best illustrated in FIG. 3. Bumps 70, preferably made of plated silver metal, are formed directly on the surface of the light source 46. The bumps 70 serve the dual purpose of electrical and mechanical (thermal) contact with substrate 30. Some of the bumps, indicated by reference number 72, contact the surface of substrate 30 to the side of the groove metallization 35 and provide paths for heat transfer 74 from light source 46 to substrate 30. The thermal bumps 72 provide a purely mechanical connection for heat transfer and mechanical bonding, while other bumps 76 provide both an electrical and mechanical connection by contacting the reference ground established by metalized layer 35. A heat sink 77, made from a material with a high thermal conductivity, such as copper, can be attached to substrate 30 for additional heat transfer, as required.

The emitter 78 of light source 46 is aligned directly over the input coupling grating 62 which is located on the flat surface 38 of optical fiber 28. Once the light source emitter 78 has been properly positioned and aligned, an epoxy 36 can be introduced between the light source 46 and substrate 30 to provide a permanent fixture. Although not shown, optical detector 48 is similarly aligned, positioned, and glued to substrate 30 in alignment with the output coupling grating 66 located on flat fiber surface 38.

Figure 4:
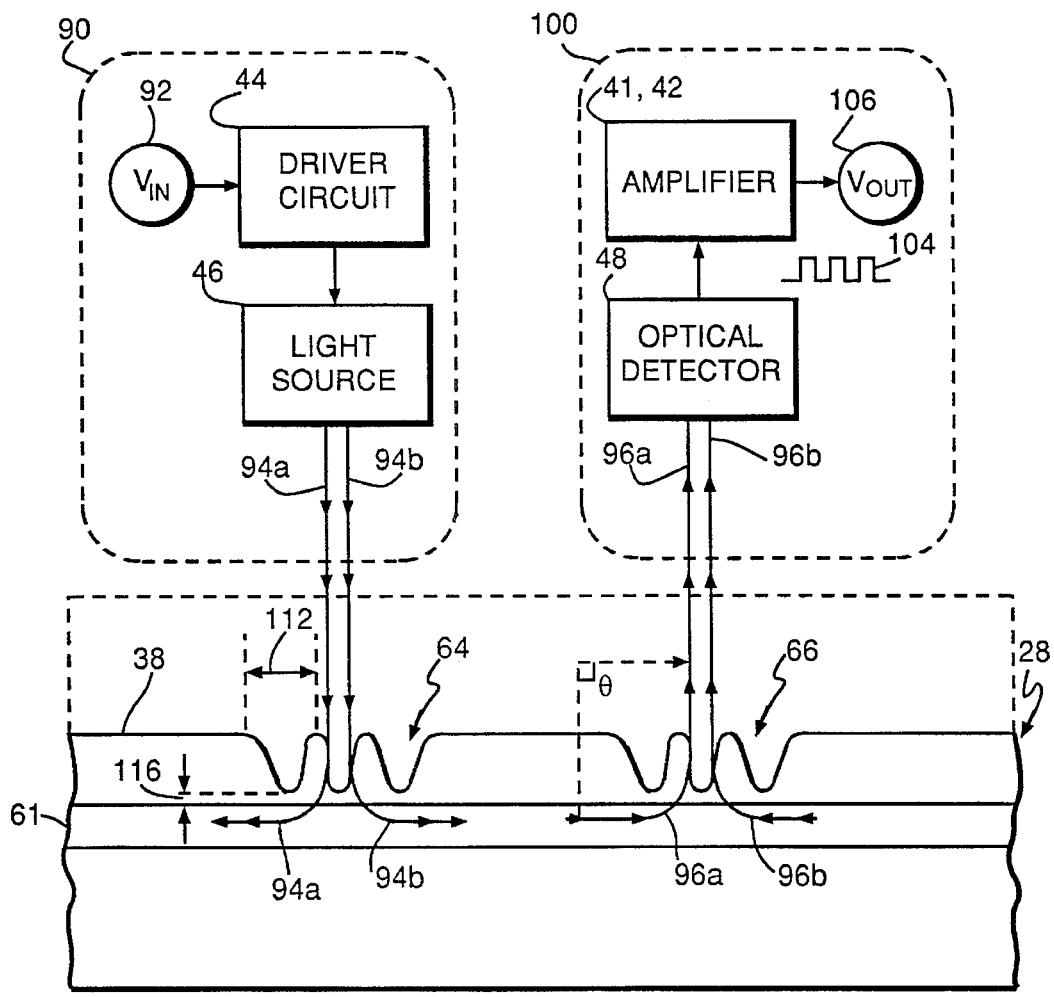
FIG. 4 is a functional block diagram showing the stages involved in interconnecting an electronic device with an optical fiber.

FIG. 4 is a block diagram illustrating the stages involved in interfacing an electronic device with an optical fiber 28. In performing the transmitting function 90, the input electrical signal 92 is applied to the driver circuit 44. The driver circuit 44 generates a current necessary to modulate the light source 46. The input light which emanates from emitter 78 of light source 46, is directed onto the fiber's input coupling grating 64.

Focusing now on receiver 100 in FIG. 4, the optical detector 48 responds to the output light 96a,b by producing an electrical signal 104. The electrical signal 104 is amplified by the transimpedance amplifier 41 and other post amplifiers 42 to produce a desired output signal 106.

The direction, wavelength, and amount of light being coupled into and out of fiber 28 depends of a variety of factors. In the preferred embodiment of the invention, bi-directional coupling is implemented to couple light into fiber core 61. For example, some of the input light 94a is coupled in one direction, while some of the input light 94b is coupled in the opposite direction. As shown in FIG. 4, the direction of coupling is a function of the slope or angle of the grating surface at which the input light is directed. Therefore, the input coupling grating 64 can be designed to allow uni-directional coupling by adjusting the grating slope as desired.

The output coupling grating 66 can be tailored in a similar way. As shown in FIG. 4, output light 96a is coupled out of the core 61 as it flows from one direction, while output light 96b is coupled out as it flows from an opposite direction.

The wavelength of light coupled into and out of the gratings, and the angle of coupling ($\Theta$) are both a function of the grating period 112. Notice that the angle of coupling ($\Theta$) is 90° for the purposes of the preferred embodiment. Therefore, the particular wavelength desired can be tailored by changing the grating period. The following formula describes the relationship between coupling angle ($\Theta$), grating period 112 and wavelength of coupled light:

$1 + \cos \Theta / N(\text{eff}) = m\lambda_0 / N(\text{eff})\Lambda$, m=1, 2, 3, ...

Where:

$\Theta$=coupling angle measured from incident direction $\lambda_0$=free space wavelength N(eff)=effective refractive index of D-shaped fiber $\Lambda$=grating period m=order of grating For $\Theta=90°$, N(eff)=1.45, and $\lambda_0=1.35$ µm, the grating period must be 0.9 µm, 1.8 µm, 2.7 µm, etc., which corresponds to the first order, second order, third order gratings, etc.

To prevent stray coupling of input light 94a,b through output coupling grating 66, the grating period of input coupling grating 64 will be different from the grating period of the output coupling grating 66. Designed in this manner, any unintentional coupling can be treated as insignificant loss in the system.

The amount of light coupled by the grating, commonly referred to as "coupling efficiency," can also be customized depending on the particular transceiver application. The coupling efficiency of the output coupling grating is critical in local area network applications since too much coupling of an optical signal into a detector will greatly reduce the amount of signal available for other devices linked to the optical fiber. Thus, the coupling efficiency can be tailored by changing the space 116 between the fiber core 61 and grating corrugations 64, 66. In the preferred embodiment, the space 116 is approximately 1 μm for both gratings 64, 66. However, the space 116 of each coupling grating 64, 66 can be independently tailored for providing different coupling efficiencies as desired.

While the particular transceiver device as herein shown and disclosed in detail is fully capable of obtaining the objects and providing the advantages herein before stated, it is to be understood that it is merely illustrative of the presently preferred embodiments of the invention and that no limitations are intended to the details of construction or design herein shown other than as described in the appended claims.

We claim:

1. An optical interconnecting device comprising:

a base support;

a D-shaped optical fiber having a core and a clad surrounding said core wherein said clad has a longitudinal flat surface side and a rounded side, and said D-shaped optical fiber is mounted on said base support with said rounded side of said clad facing said support;

a coupling grating superimposed onto said longitudinal flat surface side of said clad; and an optoelectric device mounted on said base support, said optoelectric device positioned on said base support in alignment with said coupling grating of said optical fiber to thereby provide optical communication between said optoelectric device and said fiber.

2. A device as recited in claim 1 wherein said base support is a silicon substrate.

3. A device as recited in claim 1 wherein said optoelectric device is flip chip mounted on said base support.

4. A device as recited in claim 1 wherein said optoelectric device is a light source.

5. A device as recited in claim 4 further comprising driving circuitry, electrically connected to said light source, for directing an input light signal from said light source to said coupling grating.

6. A device as recited in claim 1 wherein said optoelectric device is an optical detector.

7. A device as recited in claim 6 further comprising amplifying circuitry, electrically connected to said optical detector, for amplifying an electrical output signal from said optical detector.

8. A device as recited in claim 1 further comprising a groove formed on said base support for embedding said fiber in said base support.

9. An integrated optical transceiver comprising;

a substrate;

a D-shaped optical fiber having a core and a clad surrounding said core wherein said clad has a longitudinal flat surface side and a rounded side, and said D-shaped optical fiber is mounted on said substrate with said rounded side of said clad facing said substrate, an input coupling grating superimposed on said longitudinal flat surface side of said clad;

an output coupling grating superimposed on said longitudinal flat surface side of said clad;

a light source mounted on said substrate and aligned with said input coupling grating for optical communication from said light source to said optical fiber; and an optical detector mounted on said substrate and aligned with said output coupling grating for optical communication to said light detector from said optical fiber.

10. A device as recited in claim 9 wherein said substrate is formed from silicon.

11. A device as recited in claim 9 wherein said longitudinal curved surface side of said optical fiber is embedded in said substrate such that said longitudinal flat surface side of said fiber is substantially co-planar with said substrate surface.

12. A device as recited in claim 9, wherein said light source and said optical detector are both integrated optoelectric semiconductor devices composed of III–V elements.

13. A device as recited in claim 9, wherein said light source and said optical detector are flip chip mounted on said substrate, said light source and said optical detector making mechanical connection with said substrate for transferring heat from said light source and said optical detector to said substrate.

14. A device as recited in claim 9, further comprising:

means for electrically driving said light source, said driving means being electrically connected with said light source; and means for amplifying an output signal from said optical detector, said amplifying means electrically connected with said light detector.

15. A device as recited in claim 14 wherein said driving means is a laser driver circuit, and said amplifying means includes both a transimpedance amplifier circuit and a post amplifier circuit.

16. A device as recited in claim 14, wherein said driving means and said amplifying means are both mounted on said substrate.

17. A device as recited in claim 14, wherein said driving means and said amplifying means are fabricated within said substrate.

\* \* \* \* \*